3,813,290
GROWTH AND RECOVERY OF CELLS OF A HYDROCARBON-UTILIZING MICROORGANISM
Israel J. Heilweil and Sundaresa Srinivasan, Princeton, N.J., assignors to Mobil Oil Corporation
No Drawing. Continuation-in-part of abandoned applications Ser. No. 804,281, Mar. 4, 1969, and Ser. No. 804,298, Mar. 4, 1969. This application Apr. 10, 1972, Ser. No. 242,774
Int. Cl. C12b 1/00
U.S. Cl. 195—28 R
9 Claims

ABSTRACT OF THE DISCLOSURE

This specification discloses a process for the growth and recovery of cells of an aerobic, hydrocarbon-utilizing microorganism. The cells of the microorganism are grown in an oxygenated culture medium which is an emulsion of a hydrocarbon substrate and an aqueous mineral salt nutrient. The culture medium contains a nonionic surfactant to maintain the emulsion. The process involves a preliminary step of determining in an emulsion similar to that of the culture medium the proportion of the surfactant at which inversion of the emulsion occurs. In a subsequent step, the growth of the microorganism is carried out employing in the culture medium a proportion of the hydrocarbon substrate, aqueous mineral salt nutrient and the surfactant substantially equivalent to that at which inversion is attained. With this proportion of surfactant in the culture medium, the microorganism grows at an optimum rate and the cells thereof are readily separated and recovered from the culture medium.

CROSS-REFERENCES TO RELATED APPLICATIONS

This application is a continuation-in-part of our copending applications Ser. Nos. 804,281 and 804,298, each filed Mar. 4, 1969, both are now abandoned.

BACKGROUND OF THE INVENTION

Field of the invention

This invention relates to the growth and recovery of cells of an aerobic, hydrocarbon-utilizing microorganism.

Description of the prior art

U.S. Pat. No. 2,697,062 discloses the growth of cells of an aerobic, hydrocarbon-utilizing microorganism in a culture medium consisting of an emulsion in which water is the dispersed phase and a hydrocarbon substrate is the continuous phase and containing a surfactant for maintaining the emulsion. Separation and recovery of the cells of the microorganism is effected by mechanical separation such as filtration or centrifuging from the liquid portion of the culture medium.

U.S. Pat. No. 3,293,145 discloses the use of a nonionic surface active agent as a stimulator for the growth of an microorganism. The microorganism is incubated with a aqueous mineral salt nutrient in the presence of oxygen, an aliphatic hydrocarbon, and the surface active agent. This patent also discloses that the rate of growth of the microorganism is a function of the concentration of the surface active agent.

SUMMARY OF THE INVENTION

The process involves the growth and recovery of cells of a hydrocarbon-utilizing, aerobic microorganism at a given temperature in an agitated, oxygenated culture medium in the form of an emulsion of oil and water. The emulsion contains a given proportion of a hydrocarbon substrate as the oil phase of the emulsion, a given proportion of an aqueous mineral salt nutrient as the water phase of the emulsion, a nonionic surfactant for maintenance of the emulsion, and an inoculum of the microorganism. As a first step, there is determined in an emulsion containing the given proportion of the hydrocarbon, the given proportion of the aqueous mineral salt nutrient, and the surfactant, the temperature of the emulsion being adjusted to the given temperature at which the microorganism is to be grown, the proportion of the surfactant at which inversion of the emulsion occurs. In a second step, the microorganism is grown in an agitated culture medium in the presence of oxygen at a temperature and containing proportions of the hydrocarbon substrate, the aqueous mineral salt nutrient, and the surfactant substantially equivalent to the temperature and to the proportions of the hydrocarbon substrate, the aqueous mineral salt nutrient and the surfactant at which inversion of the emulsion occurred in the first step. As a third step, agitation of at least a portion of the culture medium is discontinued whereby the emulsion of this portion of the culture medium inverts into a single hydrocarbon phase and a single aqueous mineral salt nutrient phase containing the cells of the microorganism. As a fourth step, the cells of the microorganism are recovered from the aqueous mineral salt nutrient phase.

DESCRIPTION OF THE PREFERRED EMBODIMENTS

Growing microorganisms is of importance in view of the ability of many species to produce from low cost hydrocarbons valuable products like protein in appreciable amounts, a fact which makes them of value as feed for cattle and other animals, including humans. In these procedures, an inoculum of the microorganism, the liquid hydrocarbon substrate, and an aqueous mineral salt nutrient are mixed in a fermenter to form a culture medium. The culture medium is maintained at a suitable temperature for the growth of the microorganism and is agitated in the presence of oxygen, the temperature and the agitation in the presence of the oxygen being continued throughout the growth period. The hydrocarbon substrate provides a source of carbon, and the aqueous mineral salt nutrient provides a source of water and inorganic salts, all of which, including the oxygen, are required for the growth of the cells of the microorganism. The culture medium contains a surfactant and the surfactant effects emulsification of the hydrocarbon substrate and the aqueous mineral salt nutrient. As a result, greater accessibility, and thereby a greater rate of growth, of the microorganism with the hydrocarbon substrate and the aqueous mineral salt nutrient, is brought about. This emulsion of the hydrocarbon substrate and the aqueous mineral salt nutrient can be either an oil-in-water emulsion or a water-in-oil emulsion. In an oil-in-water emulsion, the aqueous mineral salt nutrient is the continuous phase and the hydrocarbon substrate is the dispersed phase. In a water-in-oil emulsion, hydrocarbon substrate is the continuous phase and the aqueous mineral salt nutrient is the dispersed phase.

In these procedures for the growth of a microorganism, following the growth period, the cells of the microorganism are recovered from the culture medium as product. Recovery of the cells of the microorganism is effected by physically separating the cells from the culture medium. This may be accomplished by sedimentation and decantation, centrifugation, or filtration, or by a combination of these procedures. Ordinarily, the cells of the microorganism will not settle readily from the emulsion culture medium and this makes the recovery of the cells a relatively difficult operation. Various procedures have been proposed to effect flocculation of the cells and thereby promote settling of the cells. Thus, it has been proposed to invert, or break, the emulsion whereby it forms a single hydrocarbon phase and an underlying single aqueous mineral salt nutrient phase. Upon inversion of the emulsion, the cells settle in the aqueous mineral salt nutrient phase and are readily recovered from this aqueous phase. Various procedures may be employed to invert the emulsion. Regardless of the procedure employed, it adds to the cost and complexity of producing the cells.

By the process of the invention, in the first step thereof, the proportion of surfactant in the culture medium emulsion at which inversion of the emulsion occurs is determined. Having determined this proportion, a substantially equivalent proportion of the surfactant is maintained in the culture medium during growth of the microorganism, i.e., in the second step. Thus, the growth procedure is carried out with the culture medium emulsion being maintained substantially at what may be termed inversion conditions. In the third step, with agitation of the culture medium being discontinued, inversion of the culture medium emulsion will occur spontaneously. By "inversion," we mean that the emulsion, within thirty minutes, and preferably within five minutes, of remaining quiescent, will separate into a single hydrocarbon substrate phase and an underlying single aqueous mineral salt nutrient phase. The cells of the microorganism settle from the aqueous mineral salt nutrient phase and they are recovered from this phase in the fourth step. Thus, by the process of the invention, a separate step for inversion of the emulsion to effect recovery of the cells of the microorganism is, with resultant economies, not required.

While, by the process of the invention, a separate step for inversion of the emulsion to effect recovery of the cells of the microorganism is not required, an additional, and equally important, advantage is obtained. We have discovered that, by growing the microorganism in a culture medium emulsion substantially at inversion conditions, the rate of growth of the microorganism is at a maximum. While we do not wish to be limited to the consequences of a theory, we believe that the high rate of growth of the microorganism is because the droplets of the dispersed phase in the culture medium emulsion approach minimum size as inversion conditions are approached whereby the surface area of the dispersed phase approaches a maximum with consequent greater availability of the dispersed phase of the microorganism for growth.

In the practice of the invention, the cells of the microorganism are grown employing any given microorganism with any given hydrocarbon substrate, aqueous mineral salt nutrient, and surfactant. Further, the cells of the microorganism are grown employing any given proportions of the hydrocarbon substrate and aqueous mineral salt nutrient. Moreover, the cells of the microorganism are grown under any given conditions of temperature and with the hydrocarbon substrate and aqueous mineral salt nutrient being in the liquid phase and in the form of an oil-in-water emulsion or a water-in-oil emulsion. The microorganism, the hydrocarbon substrate, the aqueous mineral salt nutrient, the proportions thereof and the temperature are any of those conventionally employed. Further discussion of the microorganism, the hydrocarbon substrate, the aqueous mineral salt nutrient, the proportions thereof, the temperature, and the form of the emulsion will appear hereinafter.

In the first step of the process of the invention, the proportion, or concentration, of the nonionic surfactant at which inversion of the culture medium emulsion subsequently employed for growth of the microorganism occurs is determined. This proportion is dependent upon the type of the surfactant as well as upon the type and proportion of hydrocarbon substrate and the aqueous mineral salt nutrient. It is also dependent upon temperature. In one way of carrying out the first step of the invention, a series of emulsions are prepared containing the same hydrocarbon substrate and the same aqueous mineral salt nutrient, and in the same proportions, as will be employed in the subsequent step for the growth of the microorganism. These emulsions will also contain the same surfactant as will be employed in the subsequent step for the growth of the microorganism. However, each emulsion will contain the surfactant in a different proportion. The proportions, or concentrations, of the surfactant may vary, for example, from 0.05 to 4.0 percent by volume and may differ from each other by increments of, for example, 0.05 or 0.10 percent by volume. The temperatures of the emulsions are adjusted to that which will be employed in the subsequent step for the growth of the microorganism. They are then agitated for a period of time which may be, for example, about five minutes. The agitation is discontinued and the emulsions are then permitted to remain quiescent. "Inversion" of a culture medium emulsion for purposes of this invention, as previously mentioned, is intended to mean the separation, within thirty, and preferably within five minutes of quiescence, of the emulsion into a single hydrocarbon substrate phase and an underlying single aqueous mineral salt nutrient phase. The emulsions are therefore permitted to remain quiescent for at least thirty minutes to determine whether separation of the emulsion into the two single phases occurs. The emulsion or emulsions in which such separation occurs are at inversion conditions and the proportion of surfactant in these emulsions is noted.

As mentioned previously, the culture medium emulsion of hydrocarbon substrate and aqueous mineral salt nutrient may be an oil-in-water emulsion or a water-in-oil emulsion. Usually, for any given proportion of hydrocarbon substrate and aqueous mineral salt nutrient and for any given temperature, lower proportions of nonionic surfactant will effect formation of an oil-in-water emulsion and higher proportions will effect formation of a water-in-oil emulsion. With proportions of surfactant between 0.05 and 4.0 volume percent, the proportions will usually span those at which both forms of emulsion are obtained. Thus, regardless of whether the culture medium emulsion employed in the subsequent step for growth of the microorganism is to be an oil-in-water emulsion or a water-in-oil emulsion, the proportion, or range thereof, of surfactant at which inversion occurs can be obtained by this way of carrying out the first step of the invention. If the proportions of surfactant at which inversion occurs is not spanned by 0.05 and 4.0 volume percent, any other suitable range of proportions of the surfactant may be used to determine the proportion at which inversion occurs.

In another way of carrying out the first step of the invention, a single emulsion is prepared and the proportion of the surfactant in this emulsion is varied until inversion of the emulsion occurs. Where the culture medium emulsion is to be an oil-in-water emulsion, the emulsion prepared in this way of carrying out the first step may conveniently be prepared containing only a small proportion of the nonionic surfactant and variation in the proportion may be made by adding additional surfactant to the emulsion to increase the proportion. The amount of the nonionic surfactant originally employed may be, for example, 0.05 percent by volume of the emulsion and addition of surfactant may be made in increments of, for example, 0.05 percent by volume. The condition of the emulsion is observed after each incremental addition of the surfactant. Thus, following each incremental addition of surfactant to the emulsion, the emulsion is shaken and then is permitted to remain quiescent for at least thirty minutes to ascertain whether inversion occurs. The proportion of the surfactant in the emulsion when inversion occurs is noted. The incremental addition of surfactant to the emulsion with agitation followed by quiescence can be continued until a water-in-oil emulsion is formed whereby the range of the proportion of the surfactant in the emulsion within which inversion occurs is determined.

Where the emulsion culture medium in which the cells of the microorganism are grown is a water-in-oil emulsion, the proportion of the surfactant at which inversion of the emulsion occurs can be ascertained in this way of carrying out the first step by preparing the emulsion employing a high concentration of the surfactant and varying the proportion of the surfactant by decreasing the proportion of the surfactant. Thus, the emulsion may be prepared with a proportion of surfactant sufficiently high to insure formation of a water-in-oil emulsion. This proportion may be, for example, 4.0 percent by volume and may be decreased in increments until inversion occurs by adding hydrocarbon substrate and aqueous mineral salt nutrient to the emulsion in the same ratio as in the initial emulsion. The hydrocarbon substrate and aqueous mineral salt nutrient may be added in increments such that the proportion of the surfactant is decreased in increments of 0.05 percent by weight. Following inversion of the emulsion, reduction of the proportion of surfactant can be continued until an oil-in-water emulsion forms to determine the range of the proportion of the surfactant within which inversion occurs.

It will be seen from the above that, regardless of whether the culture medium emulsion is an oil-in-water emulsion or a water-in-oil emulsion, the proportion of the surfactant at which inversion occurs for a given proportion of hydrocarbon substrate and aqueous mineral salt nutrient may be ascertained by either increasing or decreasing the proportion of the surfactant. Thus, where the emulsion is to be a water-in-oil emulsion, the emulsion can be initially prepared employing a small proportion of surfactant and inceasing the proportion through the range of inversion until an oil-in-water emulsion is formed. Similarly, where the emulsion is to be an oil-in-water emulsion, the emulsion can be initially prepared employing a large proportion of surfactant and decreasing the proportion through the range of inversion until a water-in-oil emulsion is formed. In each procedure, the proportion, or quantity, of the surfactant is varied until the proportion at which inversion occurs is attained. Preferably, variation in the proportion of the surfactant is effected by preparing the emulsion initially with a small proportion of surfactant and adding surfactant to the emulsion since addition of surfactant is a simpler procedure than decreasing the proportion of surfactant by adding hydrocarbon substrate and aqueous mineral salt nutrient.

The proportion of surfactant at which inversion of the emulsion occurs may be affected by the presence of the cells of the microorganism in the culture medium emulsion. Thus, the proportion of surfactant at which inversion occurs as determined in the first step of the invention may differ somewhat from the proportion at which inversion occurs in the culture medium emulsion following growth of the cells of the microorganism. This can be ascertained by growing cells of the microorganism in the emulsion and determining whether adjustment in the proportion of surfactant to attain inversion as determined in the first step is required.

In carrying out the first step of the invention, an oil-in-water emulsion and a water-in-oil emulsion are normally obtained, as previously mentioned, with low and high, respectively, proportions of the surfactant. For purposes of confirmation as to whether an emulsion is in an oil-in-water form or in a water-in-oil form, known testing procedures may be employed. For example, the emulsion can be tested for its electrical conductivity, an oil-in-water emulsion being electrically conducting and a water-in-oil emulsion being not electrically conducting.

Having determined the proportion of nonionic surfactant at which inversion of the culture medium emulsion occurs, the second step of the invention is carried out. In the second step, the microorganism is grown in an agitated culture medium in the presence of oxygen. This culture medium will contain hydrocarbon substrate, aqueous mineral salt nutrient, surfactant, and an inoculum of the microorganism. The hydrocarbon substrate and the aqueous mineral salt nutrient will be the same as employed in the first step of the invention and will be employed in proportions substantially equivalent to those employed in the first step of the invention. Further, the surfactant will be the same as employed in the first step of the invention and in a proportion substantially equivalent to that at which invension occurred in the first step of the invention. Additionally, the temperature of growth will be substantially equivalent to that employed in the first step of the invention.

Where the culture medium for growth of the microorganism contains the same proportions of hydrocarbon substrate, aqueous mineral salt nutrient, and surfactant, and is at the same temperature, at which inversion occurred in the first step of the invention, the growth procedure will be carried out at inversion conditions as defined herein. However, in order to obtain the benefits of carrying out the growth procedure at inversion conditions as defined, it is not essential to carry out the growth procedure employing precisely the proportions of hydrocarbon substrate, aqueous mineral salt nutrient, surfactant, and temperature at which inversion occurred in the first step. Rather, the benefits of the invention are obtained where the proportions, and the temperature, are substantially equivalent to those at which inversion occurred in the first step. By "substantially equivalent" we mean that the proportions of the hydrocarbon substrate, the aqueous mineral salt nutrient, and the surfactant are within 30 percent by volume, or concentration, of those at which inversion occurred in the first step and the temperature is within 15° C. of the temperature at which inversion occurred in the first step. Accordingly, in the second step of the invention, the hydrocarbon substrate, the aqueous mineral salt nutrient, and the surfactant may be employed in proportions that are not more than 30 percent by volume greater or less than the proportions in the emulsion at which inversion occurred in the first step of the invention and the temperature is not more than 15° C. greater or less than the temperature at which inversion occurred in the first step.

It will be appreciated from the foregoing paragraph that, in the first step of the invention, the proportions, and the temperature employed, may be substantially equivalent to those employed in the second step of the invention. Thus, in the first step of the invention, the proportions of the hydrocarbon substrate and the aqueous mineral salt nutrient may be 30 percent by volume greater or less than the proportions to be employed in the culture medium emulsion in the second step. Further, the temperature employed may be 15° C. greater or less than the temperature at which the microorganisms are grown in the second step.

For growth of the microorganism, the culture medium emulsion is agitated in the presence of oxygen. Agitation may be effected by shaking the fermenter containing the culture medium. It may also be effected by the use of paddles, rockers, stirrers, propellers, or other suitable types of devices. Agitation may also be effected, alone or in conjunction with other means, by injection in the culture medium of a gas that does not have an inhibiting effect on the growth of the microorganism. The oxygen may be supplied by exposing the surface of the culture medium to oxygen while being agitated. Preferably, however, the oxygen is injected into the culture medium. In this connection, the injection of the oxygen will also provide agitation of the culture medium. The oxygen to which the surface of the culture medium is exposed or which is injected into the culture medium may be pure oxygen. However, the oxygen may be mixed with other gases. Thus, for example, the surface of the culture medium may be exposed to the air or air may be injected into the culture medium. Additionally, for example, recycled gases from the growth operation may be employed.

The growth procedure is an exothermic reaction and temperature control can be effected by any means suitable for removal of heat. Thus, heat exchangers may be employed. Further, removal of heat may be effected, alone or in conjunction with heat exchangers, by evaporative cooling resulting from the injection of gas into the culture medium.

The growth procedure of the second-step of the invention may be carried out as a batch operation or as a continuous operation. In the batch operation, maintenance of the desired proportions of hydrocarbon substrate, aqueous mineral salt nutrient and surfactant can be effected by monitoring the proportions of these components and adding any of each, at intervals or continuously, as their proportions may decrease. The hydrocarbon substrate will be consumed by the microorganism as growth of the microorganism proceeds. The surfactant, in some instances, will also be consumed to some extent by the microorganism. The aqueous mineral salt nutrient can be lost from the culture medium as a result of evaporation. The rates at which the hydrocarbon substrate and the surfactant are consumed and the aqueous mineral salt nutrient is lost will be different. Thus, in the batch operation, by monitoring the proportions of the components, the extent to which the culture medium is deficient in any one component may be determined and the deficiency corrected. In a continuous operation, the hydrocarbon substrate, the aqueous mineral salt nutrient and the surfactant are introduced continuously to the culture medium while an effluent stream is continuously removed from the culture medium. The rate of removal of the effluent stream, in addition to loss and consumption of the components, is balanced against the rate of introduction of the components to maintain the desired proportion in the culture medium of each of the components. Thus, in a continuous operation, by monitoring the proportions of the components, the extent to which the rates of addition of the components and the rate of removal of effluent to maintain the desired balance becomes known.

Growth of the microorganism is for such a period of time that a desired amount of the cells of the microorganism per unit volume of the culture medium is attained. The amount of cells per unit volume of the culture medium is ordinarily referred to as the "density" of the cells. In the third step of the invention, cessation of growth of the microorganism is effected. This is accomplished by discontinuing agitation of the culture medium. In a batch operation, growth is stopped by discontinuing agitation of the entire culture medium. On the other hand, in a continuous operation, growth is stopped by discontinuing agitation of only the effluent from the culture medium. Following the discontinuing of the agitation and the portion of the culture medium in which the agitation is discontinued being quiescent, the culture medium inverts spontaneously into a single oil phase and a single aqueous mineral salt nutrient phase with the cells of the microorganism settling in the latter phase.

In the fourth step, the cells of the microorganism are recovered from the aqueous mineral salt nutrient phase. Recovery may be made by decantation or filtration or other suitable procedure for separating the cells from the aqueous mineral salt nutrient phase. Light centrifugation may be employed to assist in recovery of the cells. Intracellular protein material, and other products, may be recovered conventionally, as by rupturing the cell walls and extracting the products from the resulting debris, and thereafter separating the extract further as desired. For some purposes, as for animal feed, the cells may be used as a whole without separating protein material from them.

The method of the invention is applicable to the growth of any aerobic microbial species which is able to utilize a hydrocarbon as the source of carbon for energy and growth, including hydrocarbon-utilizing species of bacteria, fungi, yeasts, and molds. Non-fastidious organisms are preferred, i.e., those which will grow in simplified salts media without necessity for additions of organic compounds. Species which are active animal or human pathogens are excluded where microbial growth is carried out to produce food.

Of the bacteria, suitable genera include: Pseudomonas, Bacillus, Flavobacterium, and Sarcina. Illustrative species of these genera are *P. aeruginosa, P. oleovorans, P. putida, P. boreopolis, P. methanica, P. fluorescens, P. pyocyanea; B. aureus, B. acidi, B. subtilis, B. urici, B. cereus, B. coagulans, B. mycoides, B. circulans, B. megaterium; Flavovacterium aquatile; Sarcina alba,* and *Sarcina luteum. Leuconostoc mesenteroides* is a useful microorganism. A preferred genera is Pseudomonas, most species of which are able to utilize hydrocarbons.

Other preferred genera are Achromobacter and Nocardia, as illustrated by species such as *A. xverosis, A. agile, A. gutatus, A. superficialis, A. parvulus, A. cycloclastes; N. salmonicolor, N. asteroides, N. minimus, N. opaca, N. corallina, N. rubra,* and *N. paraffinae.* Other microorganisms comprise the genus Mycobacterium, including such species as *M. paraffinicum, M. phlei, M. lacticola, M. rhodochrous, M. smegnatis,* etc.

Still other hydrocarbon-utilizing bacteria are *M. methanica* and *M. species* from the genus Methanomonas; *Micrococcus paraffinae; B. aliphaticum, B. hidium,* and *B. benzoli* from the genus Bacterium; and species of Micromonospora. Other useful genera include Brevibacterium, Aerobacter, and Corynebacterium.

Of the fungi, the method is applicable to any fungus within the classification Eumycetes or true fungi, but preferably those from the class Fungi Imperfecti or from the class Phycomycetes. Preferred fungi from the class Fungi Imperfecti are species of the genera Aspergillus and Penicillium, as illustrated by *A. niger, A. glaucus, A. oryzae, A. flavus, A. terreus, A. itaconicus; P. notatum, P. chrysogenum, P. glaucum, P. griseofulvum, P. expansum, P. digitatum, P. italicum,* etc. Other suitable organisms include various species of the genera Monilia, Helminthosporium, Alternaria, Fusarium, and Myrothecium. Preferred fungi of the class Phycomycetes include species from the genera Rhizopus and Mucor, such as *R. nigricans, R. oryzae, R. delemar, R. arrhizus, R. stolonifer, R. sp.; M. mucedo, M. genevenisis.*

Some of the foregoing genera of fungi are also characterized as molds, such as Aspergillus, Penicillium, Rhizopus, and Mucor, but it will be understood that all are true fungi or Eumycetes.

Of the yeasts, the preferred organisms are of the family Cryptococcaccea, and particularly of the sub-family Cryptococcoidae. Preferred genera are Pichia, Torulopsis (or Torula) and Candida. Preferred species are *Candida lipolytica, Candida pulcherrima, Candida utilis, Candida utilis Variati major, Candida tropicalis, Candida intermedia,* and *Torulopsis colliculosa.* Other useful species are *Hansenula anomala, Oidium lactia,* and *Neurospora sitophila.*

The hydrocarbon may be chosen from a broad selection, including aliphatic, aromatic and alicyclic compounds of varying molecular weight and carbon configurations. Crude oils, various petroleum fractions, residua, and synthetic hydrocarbons containing polymers and copolymers are suitable. A preferred class of hydrocarbons comprises alkanes having up to 20, 30, or 40 carbons, more preferably those that are liquid at normal temperatures and pressures, especially incubation temperatures, and including straight and branched chain, saturated and unsaturated hydrocarbons.

Another preferred class comprises alkyl-substituted cyclic compounds having 1, 2, or more alkyl substituents each of any suitable length and comprising straight or branched chain, saturated or unsaturated radicals, and in which the cyclic moiety is aromatic or cycloparaffinic.

Alkyl-substituted aromatic hydrocarbons include toluene, the various xylenes, mesitylene, ethylbenzene, p- cymene, the diethylbenzenes, and the isomeric propylbenzenes, butylbenzenes, amylbenzenes, heptylbenzenes, and octylbenzenes. Included among the alkyl-substituted cycloparaffins are methylcyclopentane, the dimethyl- and trimethylcyclopentanes, ethylcyclopentane, the diethylcyclopentanes, the various propyl-, butyl-, amyl-, hexyl-, and octylcyclopentanes. Also the alkylcyclohexanes, which are substituted in a manner corresponding to the foregoing alkylcyclopentanes, and such compounds as the various tetramethylcyclohexanes, methylethylcyclohexanes, methylpropylcyclohexanes, and the like, are included.

It will be understood that the foregoing hydrocarbons are suitable sources of carbon for cell growth and energy. Also, it will be appreciated that the hydrocarbon may be in the liquid phase not only by having a suitable melting point but also by being dissolved in a suitable solvent. The hydrocarbons contemplated in the preceding paragraphs are those which are normally liquid at incubation temperature. However, other useful hydrocarbons are those which are normally gaseous at incubation temperature, such as methane, ethane, propane, butane, and other $C_3$ to $C_5$ hydrocarbons. These gaseous hydrocarbons may be dissolved in a normally liquid hydrocarbon, such as a petroleum fraction in the gasoline or kerosene boiling range, or in an alkane like octane, nonane, decane, etc., or they may be dissolved in any other conventional solvent therefor which is inert in the process and non-toxic to the cells. Also, normally solid hydrocarbons may be used as the source of carbon by dissolving or dispersing them in a hydrocarbon solvent, in the manner described, or in any other conventional inert non-toxic solvent.

Various non-hydrocarbon compounds may be present in the culture mixture, such as alcohols and carboxylic acids, or halogenated, phosphated, or nitrated derivatives of hydrocarbons, or fluorinated derivatives or silicone oils, the purpose of which non-hydrocarbon compounds is to improve the oxygen solubility in the culture mixture or to improve the separation of the microorganisms. Fluorocarbons are useful for increasing the oxygen solubility. The compound chosen should not, of course, be harmful to the microorganisms or adversely affect the emulsion or the breakdown of the same.

The aqueous mineral salt nutrient is conventional, comprising a source of nitrogen such as nitrate or nitrite or ammonium salt or urea, and such ions as potassium, iron, calcium, magnesium, phosphate, and sulfate, as well as ions of trace elements like zinc, manganese, copper, molybdenum, etc. Iron is omissible in some cases. As water is included in the nutrient, most of these mineral salts will usually be present in sufficient quantity in ordinary potable water supplies. However, it is desirable to add the salts to the nutrient to insure their presence in sufficient quantity for growth. Usually the nutrient consists primarily of water, which may constitute 99 percent, or more, by weight of the nutrient, although it may also constitute a lesser portion, going down to 50 percent of the nutrient. Generally, any proportion of water heretofore employed in microbial synthesis may be used.

Suitable mineral salts mixtures may be listed as follows, the components being dissolved in enough water to make one liter of solution:

TABLE I

| | Grams |
|---|---|
| Ammonium sulfate | 1.0 |
| Potassium dihydrogen phopshate | 2.0 |
| Sodium monohydrogen phosphate | 3.0 |
| Magnesium sulfate | 0.2 |
| Calcium chloride | 0.01 |
| Ferrous sulfate | 0.005 |
| Manganese sulfate | 0.002 |
| Sodium carbonate | 0.1 |
| Urea | 1.5 |

TABLE II

| | Grams |
|---|---|
| Sodium monohydrogen phosphate | 9 |
| Potassium dihydrogen phosphate | 6 |
| Ammonium sulfate | 6 |
| Magnesium sulfate | 0.6 |
| Sodium carbonate | .3 |
| Calcium chloride | 0.03 |
| Ferrous sulfate | 0.015 |
| Manganese sulfate | .006 |
| Cobalt chloride | .006 |
| Sodium molybdate | .006 |

The surfactant, also termed a emulsifying agent or a detergent, employed in the method of the invention is a nonionic surfactant. Any nonionic surfactant heretofore employed in a culture medium for growth of a microorganism on a hydrocarbon substrate in the presence of an aqueous mineral salt nutrient and oxygen is suitable. These surfactants must, at the temperature at which growth is carried out, maintain the hydrocarbon substrate and the aqueous mineral salt nutrient, in the proportions employed, in a state of emulsification and be able to change an oil-continuous emulsion to a water-continuous emulsion and vice versa. The surfactant is preferably biodegradable. However, it should not be so degraded within the time period of growth and cell recovery as to necessitate undue and uneconomic replenishment.

The surfactant is preferably a compound having an aromatic nucleus, such as a phenyl ring, substituted by a side chain of hydrophilic character such as a polyoxyethylene group, and by a side chain of lipophilic character such as an alkyl group. Agents of this kind are frequently referred to as polyoxyethylene dialkyl aryl ethers, obtainable as by reacting an alkylphenol with ethylene oxide. A preferred surfactant is nonyl phenol polyethoxylate containing 4 ethylene oxide groups, i.e., $C_9H_{19}$—$C_6H_4$—O—$(CH_2$—$CH_2$—$O)_4$—H.

Other useful nonionic agents are polyoxyethylene glycols and alkyl ether derivatives thereof; and methoxy polyoxyethylene glycols and their ester derivatives.

Still other agents are fatty acid esters, including mono- and diesters, formed from a polyol and a fatty acid. The polyol may be glycol, glycerol, sorbitol, sorbitan, mannitol, propylene glycol, polyoxyethylene glycol, etc., and the acid may be an aliphatic monocarboxylic acid, saturated or unsaturated, straight or branched chain, preferably having from 12 to 18 carbon atoms. Examples are glycerol mono- and dilaurates, glycerol mono- and dioleates, glycerol mono- and distearates, glycerol monopalmitate, glycerol monomyristate, propylene glycol monostearate, propylene glycol monopalmitate, propylene glycol monooleate, and mixtures thereof. Also, sorbitan laurate, sorbitan mono- and tristearates, sorbitan mono- and trioleates; mannitan stearates, palmitates, and laurates; mono-, di-, and triglycerides of fatty acids like oleic, palmitic, and stearic; glycerol sorbitan laurate; also polyoxyethylene laurates, stearates, oleates, and palmitates; and polyoxyethylene sorbitan palmitates, oleates, stearates, and laurates. Sucrose mono- and dipalmitates are suitable, as well as other mono- and diesters of sucrose and fatty acids of, preferably, at least 12 carbon atoms, including sucrose monolaurate, sucrose monostearate, sucrose monooleate, sucrose dilaurate, sucrose dimyristate, sucrose distearates, sucrose dioleate, and the like.

Other suitable nonionic agents are fatty acid derivatives formed by reaction of a fatty acid and ethylene oxide. Others are alcohol derivatives formed by reaction of a fatty alcohol (having at least 8 carbons) with ethylene oxide. Still other agents are fatty amide derivatives having an oxygenated side chain of hydrophilic character, with the lipophilic portion of the compound being due to the amide grouping. These derivatives may be formed by reaction of a fatty acid amide and ethylene oxide, or by reaction of a fatty acid or ester with an alkanolamine.

Particularly useful are polymeric emulsifying agents of the formula:

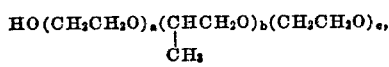

where $a$, $b$, and $c$ may be variable value sufficient to give a molecular weight ranging from several hundred to several thousand. These materials are block polymers. Other useful polymeric agents include graft and block copolymers. Also all-block nonionic polymeric agents, block-hetero or heteric-block nonionic polymeric agents, and all hetero nonionic polymeric agents are useful. Some of these materials may be expressed by means of the following formulas:

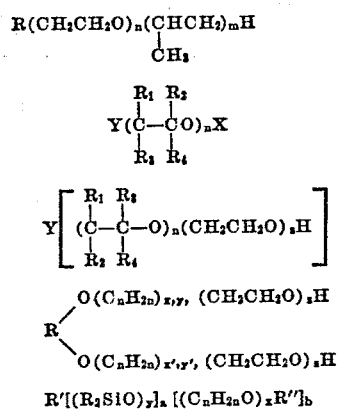

In the foregoing formulas, the following values are to be noted: R may be a straight chain or branched chain alkyl group, or substituted-alkyl group, or an aryl group, or an aralkyl or alkaryl group, or a substituted-aralkyl or -alkaryl group, and $R_1$, $R_2$, $R_3$, $R_4$, $R'$, $R''$, Y and X may be chosen from the foregoing groups. The subscripts $n$, $m$, $x$, $y$, $x'$, $y'$, $z$, $a$, and $b$ may represent a number varying from 1 to 10, 20, 50, 100 or more. Also contemplated for use are polymeric emulsifying agents, such as those set forth above, which contain one or more atoms of titanium, zirconium, germanium, phosphorus, or nitrogen.

The growth of the microorganism can be carried out employing any proportions of hydrocarbon substrate and aqueous mineral salt nutrient heretofore employed and any temperature heretofore employed. Thus, the proportion of the hydrocarbon substrate may be between 15 percent and 85 percent by volume of the mixture of hydrocarbon substrate and aqueous mineral salt nutrient. The temperature employed may be between 20° and 55° C. The pH of the culture medium is also maintained at a suitable value for growth of the microorganism. These proportions, temperatures, and pH are known to those skilled in the art and further discussion does not appear to be necessary.

During growth of the microorganism, monitoring of the proportion of the aqueous mineral salt nutrient in the culture medium emulsion may be carried out employing a Karl Fischer apparatus, such as the device known as Auto-Aquator sold by Precision Scientific Company and of the proportion of the surfactant by ultraviolet measurements.

The following examples will be illustrative of the invention. Examples 1 and 2 will illustrate the determination of inversion conditions. Examples 3–6 will illustrate the growth of a microorganism at inversion conditions. Examples 7–11 will illustrate the inversion of culture mediums, those of Examples 7–9 being of the oil-in-water form and those of Examples 10 and 11 being of the water-in-oil form. In each example, the same surfactant was employed.

EXAMPLE 1

A series of flasks containing mixtures of 40 parts by volume of n-hexadecane and 60 parts by volume of aqueous mineral salt nutrient were prepared. To the contents of the flasks were added varying proportions between 0.1 and 1.2 percent by volume of a surfactant, namely, nonyl phenol polyethoxylate containing 4 ethylene oxide groups. The flasks were thoroughly and repeatedly shaken at 25° C. over a period of several days. The resulting emulsions were then permitted to become quiescent. The emulsion in the flask containing 0.5 percent by volume of the surfactant, within 2 minutes after becoming quiescent, separated into a single layer of n-hexadecane and an underlying single layer of aqueous mineral salt nutrient. The mixture in the other flasks, however, remained in the form of emulsions. Conductivity measurements of the emulsions indicated that those containing 0.1 to 0.4 percent by volume of surfactant to be of the oil-in-water form and those containing 0.6 to 1.2 percent by volume of surfactant to be of the water-in-oil form. In this example, therefore, inversion conditions were attained where the surfactant was in the proportion of 0.5 percent by volume.

EXAMPLE 2

The procedure of Example 1 was repeated except that the flasks contained mixtures of 50 parts by volume of n-hexadecane and 50 parts by volume of the aqueous mineral salt nutrient. Inversion conditions were attained where the surfactant was in the proportion of 0.6 percent by volume. The emulsions containing less than this proportion of surfactant were of the oil-in-water form while those containing more than this proportion of surfactant were of the water-in-oil form.

EXAMPLE 3

A soil-isolated Brevibacterium was grown in shake flasks containing an emulsion of 40 parts per volume of n-hexadecane and 60 parts per volume of the aqueous mineral salt nutrient employed in the previous examples. The shake flasks contained, respectively, 0.2, 0.4, 0.5, 0.6, and 0.8 percent by volume of the surfactant. The flasks were shaken for a period of 72 hours at 36° C. The pH of the culture mediums in the flasks was neutrality. At the end of the 72-hour period, shaking of the flasks was discontinued and the culture mediums permitted to become quiescent. The density of the cells in each of the culture mediums was then measured. The results are given in Table III. In this table, as in Tables IV–VI, the density is given in terms of optical density, each unit of which is equivalent to approximately 2 grams of cells, dry weight, per liter of aqueous mineral salt nutrient.

TABLE III

Proportion of surfactant—

| percent by volume: | Optical density |
| --- | --- |
| 0.2 | 17.0 |
| 0.4 | 17.0 |
| 0.5 | 17.8 |
| 0.6 | 17.0 |
| 0.8 | 13.0 |

It will be observed from the table that the highest density of the cells, namely, 17.8, was obtained with a proportion of surfactant of 0.5 percent by volume. With this proportion, the emulsion was at inversion conditions as determined in Example 1. Whereas the temperature of growth in this example was 36° C., and the temperature in Example 1 was 25° C., the temperature of growth is substantially equivalent, i.e., within 15° C., to the temperature in Example 1. Accordingly, it will be seen that maximum growth of the microorganism was attained at inversion conditions.

EXAMPLE 4

The procedure of Example 3 was repeated except that the culture medium emulsion contained 50 parts per volume of the n-hexadecane and 50 parts by volume of the aqueous mineral salt nutrient and contained 0.3, 0.5, 0.6, 0.7, and 0.9 percent by volume of the surfactant. The results are given in the table.

TABLE IV

| Proportion of surfactant—percent by volume: | Optical density |
|---|---|
| 0.3 | 19.4 |
| 0.5 | 21.0 |
| 0.6 | 14.5 |
| 0.7 | 13.8 |
| 0.9 | 10.3 |

It will be observed from the table that the highest density of the cells was obtained with a proportion of surfactant of 0.5 percent by volume. For the proportion of hydrocarbon substrate and aqueous mineral salt nutrient employed in this example, the emulsion would be at inversion conditions, as determined in Example 2, with 0.6 percent by volume of surfactant and a temperature of 25° C. Nevertheless, the emulsion in this example was substantially at inversion conditions as determined in Example 2, namely, with a proportion of surfactant within 30 percent, and a temperature within 15° C., of the proportion and temperature of Example 2. Thus, the maximum growth of the microorganism was attained at inversion conditions.

EXAMPLE 5

The procedure of Example 3 was repeated employing, howewer, Pichia yeast and a pH of the culture medium of 3.5. The results are given in the table.

TABLE V

| Proportion of surfactant—percent by volume: | Optical density |
|---|---|
| 0.2 | 2.30 |
| 0.4 | 1.90 |
| 0.5 | 5.40 |
| 0.6 | 4.85 |
| 0.8 | 5.05 |

It will be observed that the density of the cells at a maximum was with a proportion of surfactant of 0.5 volume percent, which is the proportion of surfactant at which inversion conditions were attained in Example 1. The temperature, namely, 36° C., was within 15° C. of that of Example 1, namely 25° C. Thus, in this example, maximum growth of the microorganism was attained at inversion conditions.

EXAMPLE 6

The procedure of Example 5 was repeated employing, however, 50 parts by volume of n-hexadecane, 50 parts by volume of aqueous mineral salt nutrient, and different proportions of surfactant. The results are given in the table.

TABLE VI

| Proportion of surfactant—percent by volume: | Optical density |
|---|---|
| 0.3 | 4.30 |
| 0.5 | 4.20 |
| 0.6 | 5.70 |
| 0.7 | 6.25 |
| 0.9 | 5.60 |

It will be observed that the maximum density was obtained in the emulsion containing 0.7 percent by volume of the surfactant. This proportion of surfactant is substantially equivalent to the 0.6 percent by volume at which inversion conditions were attained in Example 2. The temperature of growth, namely, 36° C., was substantially equivalent to the temperature of 25° C. in Example 2. Thus, maximum growth of the microorganism was at inversion conditions.

EXAMPLE 7

A soil-isolated Brevibacterium was grown at 25° C. in a culture medium containing 40 parts by volume of n-hexadecane and 60 parts by volume of aqueous mineral salt nutrient medium. The culture medium did not contain a surfactant. Following growth, the culture medium was permitted to remain quiescent. There was no separation of the culture medium within thirty minutes into a single hydrocarbon substrate phase and an underlying single aqueous mineral salt nutrient phase.

To a sample of the culture medium there was added sufficient of surfactant to bring the proportion thereof in the culture medium to 0.5 percent by volume. As determined in Example 1, with this proportion of surfactant the culture medium would be at inversion conditions. Within less than five minutes after the addition of the surfactant, the culture medium separated into a single hydrocarbon substrate phase and a single underlying aqueous mineral salt nutrient phase. Upon light centrifugation, i.e., 3,700 revolutions per minute, for two minutes, there was obtained a button of the microorganism in the aqueous mineral salt nutrient phase.

EXAMPLE 8

A soil-isolated Brevibacterium was grown at 25° C. in a culture medium containing 40 parts by volume of n-hexadecane and 60 parts by volume of aqueous mineral salt nutrient. The culture medium also contained 0.4 percent by volume of surfactant. Following growth, and the culture medium remaining quiescent, there was no separation of the culture medium into two single phases. To a sample of the culture medium was added sufficient of the surfactant to bring the proportion thereof to 0.5 percent by volume, i.e., to inversion conditions. Within five minutes of the addition of the surfactant to the culture medium, there was a quantitative separation thereof into a clear hydrocarbon substrate phase and a clear aqueous mineral salt nutrient phase. Light centrifugation at 3,700 revolutions per minute for two minutes resulted in separation of a button of the microorganism from the aqueous mineral salt nutrient phase.

EXAMPLE 9

The procedure of the previous two examples was repeated except that the culture medium emulsion contained 0.2 percent by volume of the surfactant. Quiescence of the culture medium did not result in separation into two single phases. To a sample of the culture medium there was added sufficient of the surfactant to bring its proportion to 0.5 percent by volume, i.e., to inversion conditions. Within five minutes, the emulsion separated quantitatively into a clear hydrocarbon substrate phase and a clear aqueous mineral salt nutrient phase. Light centrifugation at 3,700 revolutions per minute for two minutes produced a distinct button of bacteria in the aqueous mineral salt nutrient phase.

EXAMPLE 10

A soil-isolated Brevibacterium was grown at 25° C. in a culture medium containing 40 parts of n-hexadecane to 60 parts of aqueous mineral salt nutrient medium. The culture medium also contained 0.8 percent by volume of the surfactant. Following growth, and the culture medium being permitted to remain quiescent, there was no separation of the emulsion into two single phases. With the addition of n-hexadecane and aqueous mineral salt nutrient in the ratio of 4 to 6, in an amount to reduce the proportion of the surfactant to 0.5 percent by volume, the emulsion inverted forming a single phase of n-hexadecane and a single phase of aqueous mineral salt nutrient containing cells of the microorganism.

EXAMPLE 11

The procedure of Example 10 was repeated except that the surfactant was in the culture medium in the proportion of 0.9 percent by volume. Following growth of the microorganism, and the culture medium being permitted to remain quiescent, sufficient n-hexadecane and aqueous mineral salt nutrient were added to reduce the proportion of the surfactant to 0.5 percent by volume, i.e., inversion conditions. Within five minutes a single phase of n-hexadecane and a single phase of aqueous mineral salt nutrient containing the cells of the microorganism formed.

We claim:

1. In a process for the growth and recovery of cells of a hydrocarbon-utilizing, aerobic microorganism at a given temperature in an agitated, oxygenated culture medium in the form of an emulsion of oil and water, said emulsion containing a given proportion of a hydrocarbon substrate as the oil phase of said emulsion, a given proportion of an aqueous mineral salt nutrient as the water phase of said emulsion, a nonionic surfactant for maintenance of said emulsion, and an inoculum of said microorganism, the improvement comprising: as a first step, determining in an agitated emulsion containing said given proportion of said hydrocarbon substrate, said given proportion of said aqueous mineral salt nutrient, and said surfactant, the temperature of said emulsion being adjusted to said given temperature at which said microorganism is to be grown, the proportion of said surfactant at which breaking of said emulsion into a single hydrocarbon substrate phase and a single aqueous mineral salt nutrient phase spontaneously occurs within thirty minutes after agitation of said emulsion is discontinued and said emulsion remains quiescent; as a second step, growing said microorganism in the presence of oxygen in a culture medium maintained in the form of an emulsion, said growth of said microorganism and the maintenance of said culture medium in the form of an emulsion being effected by agitation of said culture medium, said culture medium being at a temperature and containing porportions of said hydrocarbon substrate, said aqueous mineral salt nutrient, and said surfactant substantially equivalent to said temperature and to said proportions of said hydrocarbon substrate, said aqueous mineral salt nutrient, and said surfactant at which breaking of said emulsion occurred in said first step whereby said microorganism is grown in said culture medium at substantially breaking conditions of said emulsion of said culture medium and the rate of growth of said microorganism is at a maximum; as a third step, discontinuing agitation of at least a portion of said culture medium whereby growth of said microorganism in said portion of said culture medium stops and the emulsion of said portion of said culture medium as a result of discontinuing agitation spontaneously breaks within thirty minutes into a single hydrocarbon substrate phase and a single aqueous mineral salt nutrient phase containing the cells of said microorganism; and, as a fourth step, recovering said cells of said microorganism from said aqueous mineral salt nutrient phase.

2. The process of claim 1 wherein said temperature in said second step is within 15° C. of said temperature at which breaking of said emulsion occurred in said first step.

3. The process of claim 1 wherein said proportions of said hydrocarbon substrate, said aqueous mineral salt nutrient, and said surfactant in said second step are within 30 percent by volume of said proportions of said hydrocarbon substrate, said aqueous mineral salt nutrient, and said surfactant at which breaking of said emulsion occurred in said first step.

4. The process of claim 1 wherein said temperature in said second step is within 15° C. of said temperature at which inversion of said emulsion occurred in said first step and said proportions of said hydrocarbon substrate, said aqueous mineral salt nutrient, and said surfactant are within 30 percent by volume of said proportions of said hydrocarbon substrate, said aqueous mineral salt nutrient, and said surfactant at which breaking of said emulsion occurred in said first step.

5. The process of claim 1 wherein the proportion of said surfactant at which breaking of said emulsion in said first step occurs is determined by preparing an emulsion containing said given proportion of said hydrocarbon substrate and said given proportion of said aqueous mineral salt nutrient and varying the proportion of said surfactant in said emulsion.

6. The process of claim 1 wherein the proportion of said surfactant at which breaking of said emulsion in said first step occurs is determined by preparing a series of emulsions containing said given proportion of said hydrocarbon substrate and said given proportion of said aqueous mineral salt nutrient and adding to each a different proportion of said surfactant spanning over the proportion at which an oil-in-water emulsion forms and a water-in-oil emulsion forms.

7. The process of claim 1 wherein said nonionic surfactant is nonyl phenol polyethoxylate containing 4 ethylene oxide groups.

8. The process of claim 1 wherein said temperature in said second step is the same as said temperature at which breaking of said emulsion occurred in said first step and said proportions of said hydrocarbon substrate, said aqueous mineral salt nutrient, and said surfactant are the same as said proportions of said hydrocarbon substrate, said aqueous mineral salt nutrient, and said surfactant at which breaking of said emulsion occurred in said first step.

9. The process of claim 1 wherein, in said first step, there is determined the proportion of said surfactant at which breaking of said emulsion occurs spontaneously within five minutes after agitation of said emulsion is discontinued and said emulsion remains quiescent and, in said third step, the emulsion of said portion of said culture medium as a result of discontinuing agitation spontaneously breaks within five minutes.

References Cited
UNITED STATES PATENTS

| | | | |
|---|---|---|---|
| 2,697,062 | 12/1954 | Cramer | 195—3 |
| 3,578,566 | 5/1971 | Rudel et al. | 195—28 |
| 3,293,145 | 12/1966 | Leavitt et al. | 195—1 |
| 3,510,403 | 5/1970 | Laine et al. | 195—28 |

A. LOUIS MONACELL, Primary Examiner

T. G. WISEMAN, Assistant Examiner

U.S. Cl. X.R.

195—3 H

UNITED STATES PATENT OFFICE
CERTIFICATE OF CORRECTION

Patent No. 3,813,290　　　　　　Dated May 28, 1974

Inventor(s) Israel J. Heilweil and Sundaresa Srinivasan

It is certified that error appears in the above-identified patent and that said Letters Patent are hereby corrected as shown below:

Column 1, line 57, "an" should read --a--;
　　　　　line 58, "a" should read --an--.
Column 2, line 13, "equeous" should read --aqueous--.
Column 3, line 44, "phase of" should read --phase to--.
Column 5, line 32, "inceasing" should read --increasing--.
Column 6, line 9, "invension" should read --inversion--.
Column 8, line 12, "vacterium" should read --bacterium--;
　　　　　line 17, "xverosis" should read --xerosis--.
Column 9, line 68, "phopshate" should read --phosphate--.
Column 10, line 13, "termed a" should read --termed an--;
　　　　　　line 34, "dialkyl" should read --alkyl--.
Column 11, line following formula, "may be" should read
　　　　　　　　　--may be of--.
Column 15, line 36 (claim 1), "porportions" should read
　　　　　　　　　--proportions--.

Signed and sealed this 17th day of September 1974.

(SEAL)
Attest:

McCOY M. GIBSON JR.　　　　　　　　C. MARSHALL DANN
Attesting Officer　　　　　　　　　Commissioner of Patents